United States Patent
Leroux

(10) Patent No.: US 9,769,500 B1
(45) Date of Patent: Sep. 19, 2017

(54) SMART SMALL FORM-FACTOR (SFP) PLUGGABLE TRANSCEIVER

(71) Applicant: Harmonic, Inc., San Jose, CA (US)

(72) Inventor: Brent Guy Leroux, Sunnyvale, CA (US)

(73) Assignee: Harmonic, Inc., San Jose, CA (US)

( * ) Notice: Subject to any disclaimer, the term of this patent is extended or adjusted under 35 U.S.C. 154(b) by 393 days.

(21) Appl. No.: 14/567,306

(22) Filed: Dec. 11, 2014

(51) Int. Cl.
*H04N 7/12* (2006.01)
*H04N 19/85* (2014.01)

(52) U.S. Cl.
CPC .................................. *H04N 19/85* (2014.11)

(58) Field of Classification Search
CPC ....................................................... H04N 19/85
See application file for complete search history.

(56) References Cited

U.S. PATENT DOCUMENTS

| | | | | |
|---|---|---|---|---|
| 7,934,959 B2* | 5/2011 | Rephaeli | ............... | G02B 6/4201 439/620.22 |
| 8,089,973 B2* | 1/2012 | Faska | ................... | H04L 49/351 361/600 |
| 8,644,172 B2* | 2/2014 | Hinderthuer | ....... | H04Q 11/0005 370/241 |
| 8,667,194 B2* | 3/2014 | Dybsetter | ............. | H04J 3/0602 710/105 |
| 8,929,743 B2* | 1/2015 | Park | ....................... | H04B 10/40 398/137 |
| 9,282,000 B1* | 3/2016 | Dropps | .................... | H04L 49/90 |
| 9,438,503 B2* | 9/2016 | Coomber | .............. | H04L 12/413 |
| 9,497,522 B2* | 11/2016 | Neudorf | ............. | H04Q 11/0062 |
| 2008/0240225 A1* | 10/2008 | Zavadsky | ............. | H04J 3/1629 375/240 |
| 2014/0169785 A1* | 6/2014 | Roullot | .................. | H04B 10/40 398/25 |
| 2015/0195604 A1* | 7/2015 | Synowiec | ............ | G02B 6/4201 361/679.22 |
| 2017/0111120 A1* | 4/2017 | Soto | ...................... | H04B 10/808 |

* cited by examiner

*Primary Examiner* — Nhon Diep
(74) *Attorney, Agent, or Firm* — Brokaw Patent Law PC; Christopher J. Brokaw

(57) ABSTRACT

Approaches for processing video in a smart small form-factor pluggable (SFP) transceiver. The smart SFP transceiver may dynamically assess characteristics of its environment, such as link bandwidth or video attributes. Thereafter, the smart SFP transceiver dynamically selects, from a plurality of codecs available to the smart SFP transceiver, an appropriate codec for use in processing the video prior to the video being transmitted over a link. The selection of the codec may be based, at least in part, on the assessed environmental attributes. The smart SFP transceiver may then use the codec selected by the smart SFP transceiver to process the video, e.g., the video may be encoded, compressed, or timing information generated.

21 Claims, 3 Drawing Sheets

SMART SMALL FORM-FACTOR (SFP) PLUGGABLE TRANSCEIVER

FIELD OF THE INVENTION

Embodiments of the invention generally relate to an approach for processing video using a small form-factor pluggable (SFP) transceiver.

BACKGROUND

A small form-factor pluggable (SFP) transceiver is a compact, hot-pluggable device that may be physically connected to a host device via an electrical interface, such as a SFP socket or a SFP+ socket, on the host device. The purpose of a SFP transceiver is to connect the host device to a network. SFP transceivers may be used to receive data as input from the host device and deliver the data to a recipient over a networking cable connected to the SFP transceiver. The form factor and the electrical interface of a SFP transceiver are typically specified by a multi-source agreement (MSA).

One model of a SFP transceiver may be constructed to have a transmitter or receiver that sends or receives data differently than another model. As such, given factors such as bandwidth, operating distance of the network cable, and the type of network cable, one model of SFP transceiver may be better suited in a particular instance than another model. Currently, to determine which model of SFP transceiver to use, a user manually ascertains the pertinent characteristics of the host device and the network cable, and thereafter manually selects the model of SFP transceiver deemed by the user as being the best fit to service those characteristics of the host device and the network cable deemed pertinent.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for processing video using a small form-factor pluggable (SFP) transceiver are presented herein. In the following description, for the purposes of explanation, numerous specific details are set forth in order to provide a thorough understanding of the embodiments of the invention described herein. It will be apparent, however, that embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention are directed towards processing video using a SFP transceiver (referred to herein as a "smart SFP transceiver"). The smart SFP transceiver of an embodiment may process video in a manner that the device in which the smart SFP transceiver is plugged into (referred to herein as the "host device") cannot. In this way, a smart SFP transceiver may be configured to perform encoding, compressing, or switching functionality upon digital video received from the host device, even though the host device itself cannot perform such encoding, compressing, or switching functionality. This allows the smart SFP transceiver to be used with host devices that lack specialized hardware and/or software to process digital video. Advantageously, the host device may be implemented by less expensive hardware, such as a general purpose computing device.

Additionally, in certain embodiments, the smart SFP transceiver may dynamically ascertain how received digital video should be processed based on the present conditions of the environment in which the smart SFP transceiver operates or based on characteristics of the received digital video without manual input from a user. To illustrate one example of such an embodiment, a smart SFP transceiver may dynamically assess the bandwidth of a link over which the smart SFP transceiver transmits video. The smart SFP transceiver may be configured to dynamically select, from a plurality of codecs available to the smart SFP transceiver, an appropriate codec for use in encoding video based, at least in part, on the assessed bandwidth of the link. Thereafter, when the smart SFP transceiver receives digital video from the host device, the smart SFP transceiver may use the appropriate codec, selected by the smart SFP transceiver, to encode the received digital video prior to transmitting the encoded digital video over a link to another device.

Embodiments may perform a variety of different types of value-added processing to the digital video received by the smart SFP transceiver. Before describing additional embodiments, it will be helpful to appreciate the environment in which a smart SFP transceiver may be employed.

System Overview

Figure 1:
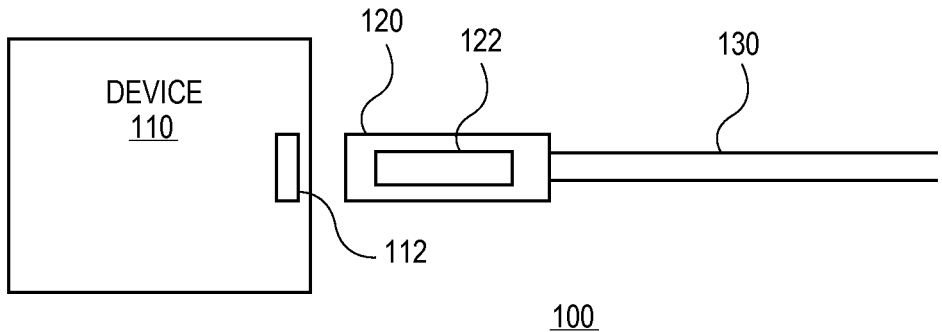
FIG. 1 is a block diagram of a system that includes a smart SFP transceiver according to an embodiment of the invention.

FIG. 1 is a block diagram of system 100 that includes smart SFP transceiver 120 according to an embodiment of the invention. As depicted in FIG. 1, smart SFP transceiver 120 may be physically connected to host device 110 at electrical interface 112 on host device 110.

Host device 110 may correspond to any type of device which may receive digital video, transmit digital video, or create digital video. Non-limiting, illustrative examples of host device 110 include a computer, an encoder, a router, and a digital TV or video camera. Host device 110 may comprise, but need not comprise, specialized digital video hardware, as host device 110 may correspond to a general-purpose computing device. As host device 110 may correspond to a general-purpose computing device, host device 110 may be implemented using less expensive hardware than special purpose digital video hardware devices.

Indeed, host device 110 may, but need not, have any capacity to encode, switch, compress, or otherwise process digital video.

Smart SFP transceiver 120 may be physically connected to host device 110 by plugging smart SFP transceiver 120 into electrical interface 112 on host device 110. Non-limiting, illustrative examples of electrical interface 112 include a SFP socket, a SFP+ socket, a RJ45 socket, and a BNC connector. Note that it is likely that the design parameters of electrical interface 112 will be governed by a multi-source agreement (MSA). Embodiments of the invention may be used with a wide variety of different types of electrical interfaces.

Once smart SFP transceiver 120 is plugged into electrical interface 122 on host device 110, host device 110 may transmit digital video to smart SFP transceiver 120. Thereafter, smart SFP transceiver 120 may process the received digital video and transmit the processed digital video over network cable 130. Network cable 130 may correspond to any cable capable of transmitting data, such as an Ethernet cable or a fiber optic cable, for example. Smart SFP transceiver 120 may receive and send digital video via a variety of different transport protocols, such as, without limitation, a MPEG transport stream, serial digital interface (SDI), Baseband Video over IP, and SMPTE 2022-6.

In an embodiment, smart SFP transceiver 120 comprises processing module 122. Processing module 122 is a software module designed to process digital video received by smart SFP transceiver 120 prior to transmitting the digital video over network cable 130. Processing module 122 may process digital video in a variety of different ways; for example, processing module 122 may be configured to perform one or more of: interpret received digital video and perform switching functionality on the digital video, encode received digital video, and compress received digital video. Processing module 122 may use a variety of different codecs to process digital video within smart SFP transceiver 120.

In an embodiment, processing module 122 may support a user interface that is remotely accessible, such as by an Internet network address. By accessing this user interface, the operating of processing module 122 may be configured and data accessible to processing module 122 may be updated. In this way, processing module 122 may be updated with additional codecs and policy data that defines the operation of processing module 122 may be remotely managed.

In an embodiment (not pictured in FIG. 1), a device transmitting data to smart SFP transceiver 120 and a device receiving the data from smart SFP transceiver 120 may be a different device than host device 110. In such an embodiment, smart SFP transceiver 120 may be coupled to two or more devices (one of which might be host device 110) via a cable or other communications medium. In this way, smart SFP transceiver 120 could send data to and receive data from multiple devices. However, for clarity, embodiments of the invention shall chiefly be described with reference to smart SFP transceiver 120 communicating with a single device (namely host device 110); however, smart SFP transceiver 120 may communicate with any number of host devices 110 in other embodiments.

Having provided a description of an illustrative system 100, additional details will be provided below regarding the operation of processing module 122.

Processing Video at the Smart SFP Transceiver

Figure 2:
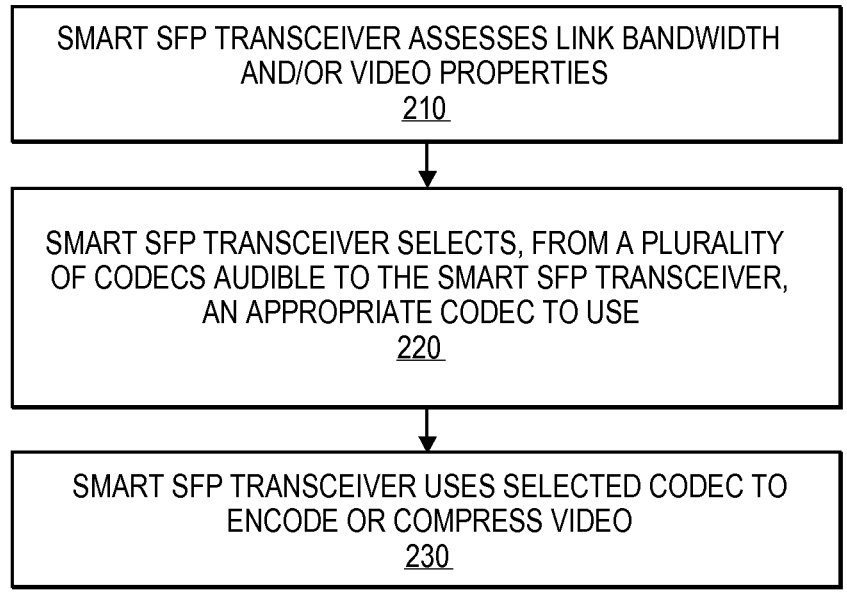
FIG. 2 is a flowchart illustrating the steps of processing video using a smart SFP transceiver according to an embodiment of the invention.

FIG. 2 is a flowchart illustrating the steps of processing video using smart SFP transceiver 120 according to an embodiment of the invention. In an embodiment, the steps of FIG. 2 may each be performed by processing module 122.

Step 210 depicted in FIG. 2 is an optional step; as such, certain embodiments may not perform step 210. In step 210, smart SFP transceiver 120 may assess the present condition of the environment in which smart SFP transceiver 120 operates or may assess the characteristics of digital video received by smart SFP transceiver 120. The purpose of performing step 210 is for smart SFP transceiver 120 to collect information which may be used in determining how to optimally process received digital video received in step 220.

Figure 3A:
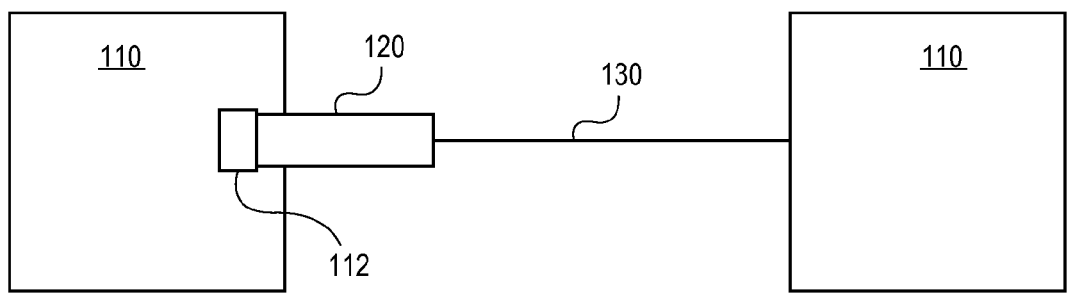
FIG. 3A is a block diagram of a system having a smart SFP transceiver only at the originating end of a link according to an embodiment of the invention.

As an example of performing step 210, smart SFP transceiver 120 may assess the bandwidth of link 130. Embodiments may assess the bandwidth of link 130 in different ways. To illustrate one way to assess the bandwidth of link 130, consider FIG. 3A, which is a block diagram of a system having smart SFP transceiver 120 only at one end of link 130 in accordance with an embodiment of the invention. In such an embodiment, smart SFP transceiver 120 may communicate with a software process executing on host device 110 to determine the bandwidth of link 130. Note that the smart SFP transceiver 120 shown in FIG. 3A may be at the origination or termination end of link 130; regardless of whether smart SFP transceiver 120 is at the origination or termination end of link 130, smart SFP transceiver 120 may act to transform the data carried over link 130 as instructed by the host device.

Figure 3B:
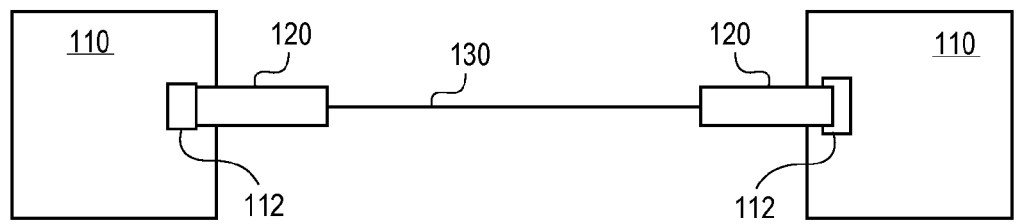
FIG. 3B is a block diagram of a system having a smart SFP transceiver at each end of a link according to an embodiment of the invention.

As an example of another way of assessing the bandwidth of link 130, consider FIG. 3B, which is a block diagram of a system having a smart SFP transceiver 120 at each end of link 130 in accordance with an embodiment of the invention; in such an embodiment, smart SFP transceivers 120 on both ends of link 130 may communicate with each other to determine the bandwidth of link 130. In an embodiment, smart SFP transceiver 120 may be one of a plurality of smart SFP transceivers, and so each individual smart SFP transceiver 120 may be configured to share bandwidth over a link with one or more other smart SFP transmitters.

In an embodiment, smart SFP transceiver 120 may be configured to communicate with an Openflow controller to establish a Quality of Service per stream. Thus, in step 210, a smart SFP transceiver 120 may assess the present condition of the environment in which smart SFP transceiver 120 operates by communicating with an Openflow controller to establish a Quality of Service per stream.

In an embodiment, after determining the total bandwidth of link 130, smart SFP transceivers 120 may dynamically assess how much of the total available bandwidth of link 130 should be used by smart SFP transceiver 120 to transmit a portion of video. This type of assessment may allow smart SFP transceiver 120 to determine an appropriate codec to use in encoding or compression a particular video to yield lossless compression of the video, while still accommodating additional traffic across link 130.

In step 220, smart SFP transceiver 120 selects, from a plurality of codecs available to smart SFP transceiver 120, an appropriate codec to use in processing video data received from host device 110. The determination of step 220 may be based, at least in part, upon information obtained in step 210, such as the total available bandwidth of link 130. Smart SFP transceiver 120 may consult a policy to determine which codec, from among a number of codecs available to processing module 122, is most appropriate for processing video data received from host device 110. For example, a policy might indicate that the appropriate codec is selected, at least in part, to compress the video based on an amount of available bandwidth for transmitting video over link 130.

In step 230, after processing module 122 determines an appropriate codec to use in processing video data received from host device 110, processing module 122 of smart SFP transceiver 120 uses the codec selected in step 220 to process the video data. After processing module 122 processes the video using the selected codec, the processed video may be delivered to its intended recipient over link 130.

Managing Workload

In an embodiment, processing module 122 of smart SFP transceiver 120 may communicate with host device 110 to determine how to divide responsibility for processing a video between processing module 122 and host device 110. Smart SFP transceiver 120 and host device 110 may establish a back channel to exchange communicates. Over this back channel, host device 110 may provide smart SFP transceiver 120 which a capabilities list which describes the capabilities of host device 110. This capabilities list may be used in determining how to divide responsibility for processing a video between processing module 122 and host device 110. In this way, if host device 110 is not capable of processing video using a certain codec which smart SFP transceiver 120 can process, then host device 110 may delegate responsibility for processing video in that codec to smart SFP transceiver 120.

Work may be offloaded or shared between smart SFP transceiver 120 and host device 100 based on current assessment of availability. For example, assume that host device 110 is able to process video using the codec selected by processing module 122 in step 220. In such a case, if processing module 122 becomes overloaded, then processing module 122 may issue a request to device 110 to assume responsibility for a unit a work to reduce the workload on processing module 122.

Alternately, assume that host device 110 is process video using a codec which is known to processing module 122. If host device 110 becomes overloaded, then host device 110 may issue a request to processing module 122 to assume responsibility for a unit a work to reduce the workload on host device 110.

Advantageously, either of smart SFP transceiver 120 and host device 110 may offload processing to the other if the other can perform the offloaded unit of work. In this way, smart SFP transceiver 120 may assist host device 110 even if host device 110 is capable of processing video in some of the same codecs as smart SFP transceiver 120.

Coordinating Timing Between Devices

In an embodiment, smart SFP transceiver 120 may generate value-added timing information and transmit the same along with the processed video data over link 130. Such timing information may be used to synchronize clocks and perform switching functionality between devices. For example, device 110 may send a Precision Time Protocol (PTP) message to smart SFP transceiver 120, which may be subsequently received by processing module 122. When processing module 122 processes the Precision Time Protocol (PTP) message, processing module 122 may convert this signal into a video pulse to be sent, along with the video data, over the link[BL1]. As another example, smart SFP transceiver 120 may obtain video timing information from the video input. Smart SFP transceiver 120 may convert this timing information into a PTP message or similar communication using a like protocol to synchronize the video output of multiple smart SFP transceivers 120.

Hardware Mechanisms

Figure 4:
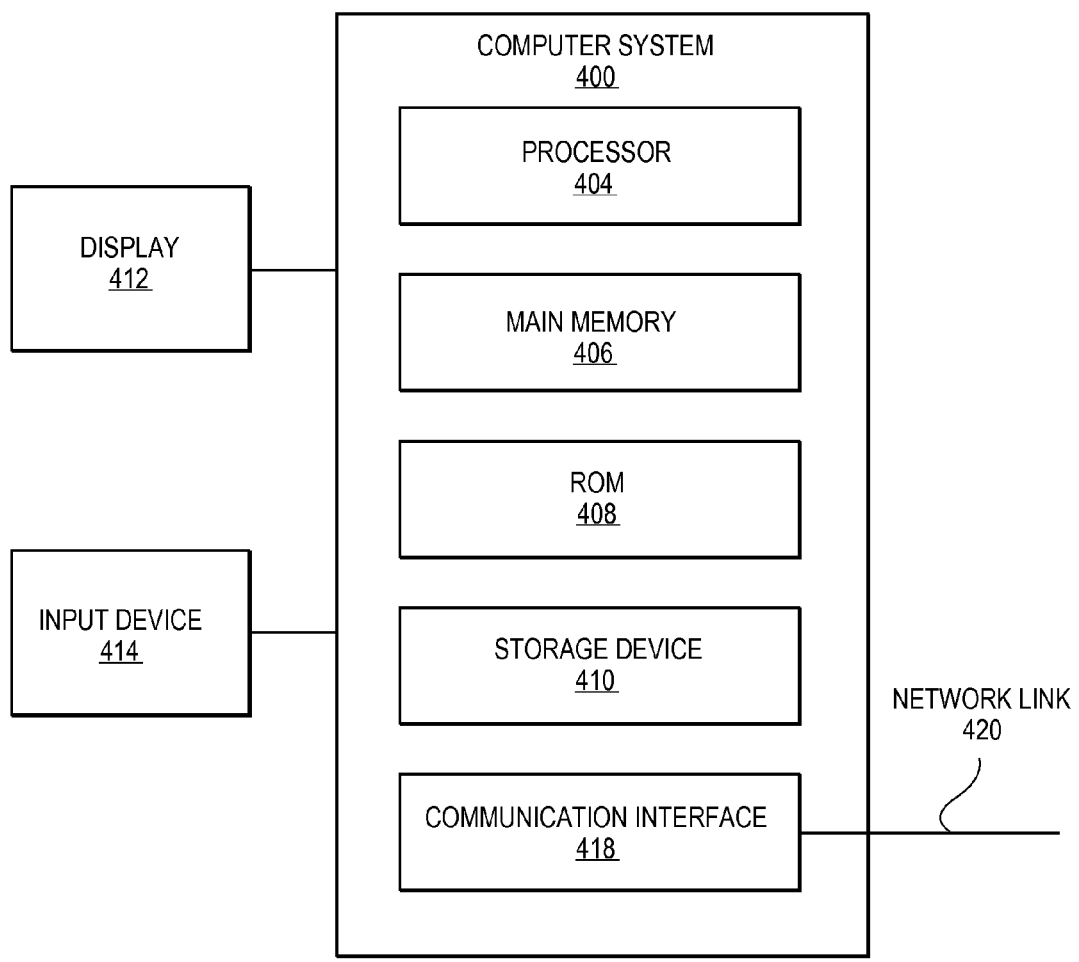
FIG. 4 is a block diagram that illustrates a computer system upon which an embodiment of the invention may be implemented.

In an embodiment, one or more of user device 110 and smart SFP transceiver 120 depicted in FIG. 1 may be implemented by one or more computer systems. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Smart SFP transceiver 120 may contain some, but not all, of the components of computer system 400 depicted in FIG. 4; for example, in most embodiments, smart SFP transceiver 120 may not comprise display 412 or input device 414.

Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, a hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium of a small form-factor pluggable (SFP) transceiver that stores one or more sequences of instructions for processing video, which when executed by one or more processors, cause:
   the SFP transceiver dynamically assessing bandwidth of a link over which said SFP transceiver transmits video;
   the SFP transceiver dynamically selecting, from a plurality of codecs available to the SFP transceiver, an appropriate codec for use in encoding said video prior to said video being transmitted over said link, wherein said selecting is performed based, at least in part, on the assessed bandwidth of said link; and
   the SFP transceiver using the appropriate codec, selected by the SFP transceiver, to encode said video.

2. The non-transitory computer-readable storage medium of claim 1, wherein said SFP transceiver dynamically assessing bandwidth of said link comprises:
   the SFP transceiver dynamically assessing how much of the available bandwidth of said link should be used by said SFP transceiver to transmit said video.

3. The non-transitory computer-readable storage medium of claim 1, wherein said SFP transceiver is connected to a host device which is unable to process video using said appropriate codec.

4. The non-transitory computer-readable storage medium of claim 1, wherein said SFP transceiver is connected to a host device which is able to process video using said appropriate codec, and wherein execution of said one or more sequences of instructions further cause:
   the SFP transceiver communicating with the host device to determine how to divide responsibility for processing said video between said SFP transceiver and said host device.

5. The non-transitory computer-readable storage medium of claim 1, wherein said appropriate codec is selected, at least in part, to compress said video based on an amount of available link bandwidth for transmitting said video over said link.

6. The non-transitory computer-readable storage medium of claim 1, wherein execution of the one or more sequences of instructions further causes:
   upon said SFP receiver receiving a Precision Time Protocol (PTP) message from said host device, said SFP receiver converting said PTP message into a video pulse to be sent, along with said video, over said link.

7. The non-transitory computer-readable storage medium of claim 1, wherein said SFP transceiver is a first SFP transceiver, and wherein dynamically assessing bandwidth of a link comprises:
   said first SFP transceiver communicating over said link to a second SFP transceiver physically coupled to a second device, wherein said second SFP transceiver processes said video using a codec not available to said second device.

8. A small form-factor pluggable (SFP) transceiver, comprising:
   one or more processors; and
   one or more non-transitory computer-readable storage mediums storing one or more sequences of instructions for processing video, which when executed by the one or more processors, cause:
      the SFP transceiver dynamically assessing bandwidth of a link over which said SFP transceiver transmits video;
      the SFP transceiver dynamically selecting, from a plurality of codecs available to the SFP transceiver, an appropriate codec for use in encoding said video prior to said video being transmitted over said link, wherein said selecting is performed based, at least in part, on the assessed bandwidth of said link; and
      the SFP transceiver using the appropriate codec, selected by the SFP transceiver, to encode said video.

9. The small form-factor pluggable (SFP) transceiver of claim 8, wherein said SFP transceiver dynamically assessing bandwidth of said link comprises:
the SFP transceiver dynamically assessing how much of the available bandwidth of said link should be used by said SFP transceiver to transmit said video.

10. The small form-factor pluggable (SFP) transceiver of claim 8, wherein said SFP transceiver is connected to a host device which is unable to process video using said appropriate codec.

11. The small form-factor pluggable (SFP) transceiver of claim 8, wherein said SFP transceiver is connected to a host device which is able to process video using said appropriate codec, and wherein execution of said one or more sequences of instructions further cause:
the SFP transceiver communicating with the host device to determine how to divide responsibility for processing said video between said SFP transceiver and said host device.

12. The small form-factor pluggable (SFP) transceiver of claim 8, wherein said appropriate codec is selected, at least in part, to compress said video based on an amount of available link bandwidth for transmitting said video over said link.

13. The small form-factor pluggable (SFP) transceiver of claim 8, wherein execution of the one or more sequences of instructions further causes:
upon said SFP receiver receiving a Precision Time Protocol (PTP) message from said host device, said SFP receiver converting said PTP message into a video pulse to be sent, along with said video, over said link.

14. The small form-factor pluggable (SFP) transceiver of claim 8, wherein dynamically assessing bandwidth of a link comprises:
communicating over said link to a different SFP transceiver physically coupled to a second device, wherein said different SFP transceiver processes said video using a codec not available to said second device.

15. A method for processing video, comprising:
a SFP transceiver dynamically assessing bandwidth of a link over which said SFP transceiver transmits video;
the SFP transceiver dynamically selecting, from a plurality of codecs available to the SFP transceiver, an appropriate codec for use in encoding said video prior to said video being transmitted over said link, wherein said selecting is performed based, at least in part, on the assessed bandwidth of said link; and
the SFP transceiver using the appropriate codec, selected by the SFP transceiver, to encode said video.

16. The method of claim 15, wherein said SFP transceiver dynamically assessing bandwidth of said link comprises:
the SFP transceiver dynamically assessing how much of the available bandwidth of said link should be used by said SFP transceiver to transmit said video.

17. The method of claim 15, wherein said SFP transceiver is connected to a host device which is unable to process video using said appropriate codec.

18. The method of claim 15, wherein said SFP transceiver is connected to a host device which is able to process video using said appropriate codec, and wherein execution of said one or more sequences of instructions further cause:
the SFP transceiver communicating with the host device to determine how to divide responsibility for processing said video between said SFP transceiver and said host device.

19. The method of claim 15, wherein said appropriate codec is selected, at least in part, to compress said video based on an amount of available link bandwidth for transmitting said video over said link.

20. The method of claim 15, further comprising:
upon said SFP receiver receiving a Precision Time Protocol (PTP) message from said host device, said SFP receiver converting said PTP message into a video pulse to be sent, along with said video, over said link.

21. The method of claim 15, wherein said SFP transceiver is a first SFP transceiver, and wherein dynamically assessing bandwidth of a link comprises:
said first SFP transceiver communicating over said link to a second SFP transceiver physically coupled to a second device, wherein said second SFP transceiver processes said video using a codec not available to said second device.

* * * * *